UNITED STATES PATENT OFFICE.

ALFRED NOBEL, OF HAMBURG, GERMANY, ASSIGNOR TO THE UNITED STATES BLASTING-OIL COMPANY, OF NEW YORK, N. Y.

IMPROVEMENT IN NITRO-GLYCERINE COMPOUNDS.

Specification forming part of Letters Patent No. 50,617, dated October 24, 1865; reissue No. 3,380, dated April 13, 1869; reissue No. 4,819, dated March 19, 1872.

DIVISION E.

SPECIFICATION.

*To all whom it may concern:*

Be it known that ALFRED NOBEL, of the city of Hamburg, Germany, has invented certain new and useful Improvements in the Manufacture of Nitro-Glycerine, and certain compounds thereof, and in the utilization of nitro-glycerine as an explosive.

The improvement in the manufacture of nitro-glycerine is the subject of a separate specification; this specification having reference to the utilization of nitro-glycerine as an explosive.

Nitro-glycerine belongs to a class of explosives long known, but not at the date of NOBEL'S invention applied to technical purposes, in consequence of practical difficulties in procuring their explosion. Nitro-glycerine is liquid at ordinary temperatures, and by that characteristic is distinguishable from solid explosives, such as gunpowder, gun-cotton, &c., and has also the property that fire may be applied to it without its exploding. Nitro-glycerine, for example, if ignited in an open space, is slowly decomposed and takes fire; but the flame is apt to die out when the match is withdrawn, hence it cannot, under ordinary circumstances, be looked upon as a ready explosive agent; for, while gunpowder and other substances used as explosives prior to NOBEL'S invention always explode when fire is set to them, nitro-glycerine will not explode from the mere contact of flame. So, also, if a drop of nitro-glycerine be poured on an anvil, the blow of a hammer causes it to explode; but only that part is involved which has received the blow, so that in this case the explosion is merely a local one.

A principal object of NOBEL'S invention consists in the removal of this obstacle to the use of nitro-glycerine as an explosive. For this end two different methods have been invented by NOBEL for promoting the explosion of nitro-glycerine: one method, which forms the subject of this patent, consists in a compound with nitro-glycerine of a readily-ignitible substance; and the other method, which is described in a separate specification, relates to the means of effecting the explosion.

NOBEL discovered that, by mixing nitro-glycerine with rocket-powder, which is a mere loose mechanical mixture of niter, charcoal, and sulphur, the difficulty in effecting the explosion of nitro-glycerine was effectually overcome. Rocket-powder is almost non-explosive, but readily burns and deflagrates on contact with a spark of fire, while nitro-glycerine, on the other hand, as before stated, is hard to explode; but when the explosion is obtained is extremely violent in its effects.

By the mixing of these substances a compound is produced which is a very powerful explosive, and is easily exploded by means of the simple contact with fire. The mixing may be effected in any convenient manner, and the proportions in which they are combined may be varied to suit the pleasure or convenience of the user or manufacturer.

What, therefore, we claim as the invention of ALFRED NOBEL, and desire to secure by Letters Patent, is—

The mixture of nitro-glycerine and rocket-powder, substantially as and for the purposes hereinbefore described.

In witness whereof the said THE UNITED STATES BLASTING-OIL COMPANY, by TAL. P. SHAFFNER, President, have hereunto set their hand.

THE UNITED STATES BLASTING-OIL CO.,
By TAL. P. SHAFFNER, *President.*

Witnesses:
OCTAVIUS KNIGHT,
EDM. F. BROWN.